(12) United States Patent
Stirbu

(10) Patent No.: US 8,261,341 B2
(45) Date of Patent: Sep. 4, 2012

(54) UPNP VPN GATEWAY CONFIGURATION SERVICE

(75) Inventor: Vlad Stirbu, Tampere (FI)

(73) Assignee: Nokia Corporation (FI)

( * ) Notice: Subject to any disclaimer, the term of this patent is extended or adjusted under 35 U.S.C. 154(b) by 651 days.

(21) Appl. No.: 11/045,198

(22) Filed: Jan. 27, 2005

(65) Prior Publication Data

US 2006/0168656 A1  Jul. 27, 2006

(51) Int. Cl.
*H04L 29/06* (2006.01)
(52) U.S. Cl. .......... 726/15; 709/200; 709/238; 709/227; 709/223; 709/220; 713/150; 713/153; 380/277; 380/255
(58) Field of Classification Search ..................... 726/15; 370/221, 901, 351
See application file for complete search history.

(56) References Cited

U.S. PATENT DOCUMENTS

| | | | |
|---|---|---|---|
| 5,734,865 A | 3/1998 | Yu | |
| 6,052,788 A * | 4/2000 | Wesinger et al. ................ | 726/11 |
| 7,167,920 B2 * | 1/2007 | Traversat et al. ............ | 709/230 |
| 7,233,782 B2 * | 6/2007 | Bao et al. ................... | 455/404.2 |
| 7,237,260 B2 * | 6/2007 | Yu et al. .......................... | 726/11 |
| 7,284,271 B2 * | 10/2007 | Lucovsky et al. ............... | 726/21 |
| 7,287,055 B2 * | 10/2007 | Cannata et al. .............. | 709/204 |
| 7,346,025 B2 * | 3/2008 | Bryson ......................... | 370/328 |
| 2001/0027442 A1 * | 10/2001 | Krahn et al. .................... | 705/51 |
| 2002/0066029 A1 * | 5/2002 | Yi ................................ | 713/201 |
| 2002/0184487 A1 | 12/2002 | Badamo et al. | |
| 2002/0199007 A1 | 12/2002 | Clayton et al. | |
| 2003/0018889 A1 * | 1/2003 | Burnett et al. ................ | 713/153 |
| 2003/0041136 A1 * | 2/2003 | Cheline et al. ................ | 709/223 |
| 2003/0088698 A1 * | 5/2003 | Singh et al. .................... | 709/239 |
| 2004/0025051 A1 * | 2/2004 | Adrangi et al. ............... | 713/201 |
| 2004/0037260 A1 * | 2/2004 | Kakemizu et al. ............ | 370/338 |
| 2004/0093492 A1 * | 5/2004 | Daude et al. .................. | 713/156 |
| 2004/0123091 A1 * | 6/2004 | Das ................................... | 713/2 |
| 2004/0193943 A1 * | 9/2004 | Angelino et al. ................. | 714/4 |
| 2004/0204086 A1 * | 10/2004 | Choi et al. ..................... | 455/557 |
| 2004/0218611 A1 * | 11/2004 | Kim ............................. | 370/401 |
| 2004/0223500 A1 | 11/2004 | Sanderson et al. | |
| 2004/0225895 A1 * | 11/2004 | Mukherjee et al. ........... | 713/201 |
| 2004/0268121 A1 * | 12/2004 | Shelest et al. ................. | 713/156 |
| 2005/0068942 A1 * | 3/2005 | Chu et al. ...................... | 370/352 |

(Continued)

FOREIGN PATENT DOCUMENTS

JP  2004135248  4/2004

OTHER PUBLICATIONS

Saint-Hilaire et al., "RemoteUIClient:1 Service Template Version 1.01", 2004, UPnP Forum, p. 1-29.*

(Continued)

*Primary Examiner* — Eleni Shiferaw
*Assistant Examiner* — Jeffery Williams
(74) *Attorney, Agent, or Firm* — Banner & Witcoff, Ltd.

(57) ABSTRACT

A system and method for creating a virtual private network through a VPN gateway configuration service. The VPN gateway configuration service inherits UPnP zero-configuration characteristics and also provides an interface for configuring the VPN gateway that enables the configuration of any VPN gateway device, regardless of manufacturer. Additionally, the device control protocol defined by the VPN gateway configuration service can provide client provisioning, as well as enabling the configuration of gateway-to-gateway virtual private networks.

20 Claims, 4 Drawing Sheets

U.S. PATENT DOCUMENTS

| | | | |
|---|---|---|---|
| 2005/0108430 A1* | 5/2005 | Howarth et al. | 709/245 |
| 2005/0128979 A1* | 6/2005 | Wu et al. | 370/331 |
| 2005/0135269 A1* | 6/2005 | Saint-Hilaire et al. | 370/254 |
| 2005/0144200 A1* | 6/2005 | Hesselink et al. | 707/204 |
| 2005/0182824 A1* | 8/2005 | Cotte | 709/217 |
| 2005/0185658 A1* | 8/2005 | Kamiwada et al. | 370/401 |
| 2005/0193085 A1* | 9/2005 | Shimizu | 709/216 |
| 2005/0198532 A1* | 9/2005 | Comlekoglu et al. | 713/201 |
| 2005/0207361 A1* | 9/2005 | Rosenberg et al. | 370/282 |
| 2005/0232273 A1* | 10/2005 | Suzuki | 370/392 |
| 2006/0070033 A1* | 3/2006 | Care et al. | 717/124 |
| 2006/0101026 A1* | 5/2006 | Fukushima | 707/100 |
| 2006/0111113 A1* | 5/2006 | Waris | 455/441 |
| 2006/0143702 A1* | 6/2006 | Hisada et al. | 726/15 |
| 2006/0165087 A1* | 7/2006 | Page et al. | 370/395.3 |
| 2006/0168241 A1* | 7/2006 | Puthiyandyil et al. | 709/227 |
| 2006/0168354 A1* | 7/2006 | Hutter | 709/250 |
| 2007/0064696 A1* | 3/2007 | Min | 370/392 |
| 2007/0219953 A1* | 9/2007 | Mak | 707/3 |

OTHER PUBLICATIONS

Stamatis Karnouskos, Realization of a secure active and programmable network infrastructure via mobile agent technology, Computer Communications, vol. 25, Issue 16, Oct. 1, 2002, pp. 1465-1476, ISSN 0140-3664, 10.1016/S0140-3664(02)00047-6. (http://www.sciencedirect.com/science/article/pii/S0140366402000476).*

Notification of Reason(s) for Refusal for Japanese Patent Application No. 2007-552740, mailed Nov. 30, 2009, 4 pages.

S. Karnouskos, "Realization of a secure active and programmable network infrastructure via mobile agent technology" Computer Communications, Elsevier Science Publishers BV, Amsterdam, NL LNKD-DOI:10.1016/S0140-3664(02)00047-6, vol. 25, No. 16, pp. 1465-1476, Oct. 1, 2002.

A. Cray, "Remote Access Over Easy" Data Communications, McGraw Hill, New York, US, vol. 28, No. 1, pp. 56 and 58, Jan. 1, 1999.

Supplementary European Search Report dated Sep. 21, 2010.

European Application No. 06 710 249.1—Office Action dated Jan. 23, 2012.

Australian Application No. 2006208939—Notice of Acceptance dated May 29, 2009.

Korean Application No. 10-2007-7019135—Office Action dated Feb. 4, 2009.

Korean Application No. 10-2007-7019135—Office Action dated Jun. 30, 2009.

* cited by examiner

UPNP VPN GATEWAY CONFIGURATION SERVICE

BACKGROUND OF THE INVENTION

The present invention relates generally to virtual private networks. More particularly, the present invention relates to the creation of virtual private networks that permit interaction between a local area network and an out-of-network electronic device.

BACKGROUND OF THE INVENTION

Universal Plug and Play (UPnP) technology defines an architecture for pervasive peer-to-peer network connectivity of intelligent appliances, wireless devices, and personal computers of all types. UPnP technology is designed to bring easy-to-use, flexible, standards-based connectivity to ad-hoc or unmanaged networks whether in the home, in a small business, public locations, or systems connected to the Internet. UPnP technology provides a distributed, open networking architecture that leverages TCP/IP and web technologies to enable seamless proximity networking, in addition to providing control and data transfer among networked devices.

UPnP Device Architecture (UDA) is designed to support zero-configuration, "invisible" networking, as well as automatic discovery for a breadth of device categories from a wide range of vendors. Under this architecture, a device can dynamically join a network, obtain an IP address, convey the device's capabilities, and learn about the presence and capabilities of other devices within the network.

A UPnP Internet Gateway Device (IGD) is a device that connects a home network to a wide area network such as the Internet. An IGD possesses at least a wide area network (WAN) interface (in the form of a DSL, Cable, Ethernet connection, or another type of connection) and a local area network (LAN) interface (in the form of an Ethernet or wireless LAN (WLAN) connection, or another type of connection). The UPnP IGD contains several WAN and LAN related services.

Virtual Private Networks (VPNs) using IP Security (IPSec) are one of the most widely used technologies to securely connect to a network using the infrastructure provided by a public network such as the Internet.

A number of new technologies are currently being implemented for enabling remote access to home networks. One of the proposed technologies that will enable remote access to home networks involves the use of a VPN between a remote device, such as a mobile telephone, and the Internet gateway located within a home network. VPN standards that are currently being developed involves the use of IPsec, which is a very complex technical standard that requires a deep understanding of cryptographic algorithms and the way IP networks function. Configuring devices that deploy IPSec technology is a complicated task due to the large number of parameters involved. The correct configuration ensures that a particular VPN client can connect to the VPN gateway, thus enabling the DLNA Remote Access scenarios. Most consumers, however, do not have the requisite skills to correctly configure such VPN devices unless they have a substantial technical expertise.

In the corporate environment, a number proprietary solutions have been developed to address these issues. These solutions are often provided by the VPN gateway manufacturer. However, these solutions are not interoperable, depend on specific VPN gateway hardware, and their costs are usually well beyond the reach of the ordinary consumers.

SUMMARY OF THE INVENTION

The present invention involves the use of an open interface that enables the configuration of a VPN gateway that is collocated with an IGD. The present invention provides for a mechanism for provisioning VPN parameters to VPN clients via UPnP messages, as well as a mechanism for configuring another IGD with a VPN gateway in order to establish a gateway-gateway VPN.

The present invention provides for a number of advantages over conventional systems. Under the system and method of the present invention, users are provided with the ability to configure VPN parameters, regardless of the manufacturer or manufacturers of the various VPN devices. The complexity involved with the present invention is relatively low, and the present invention makes VPN technologies accessible to normal consumers that, until the present invention, were available only to enterprise and large, institutional users.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
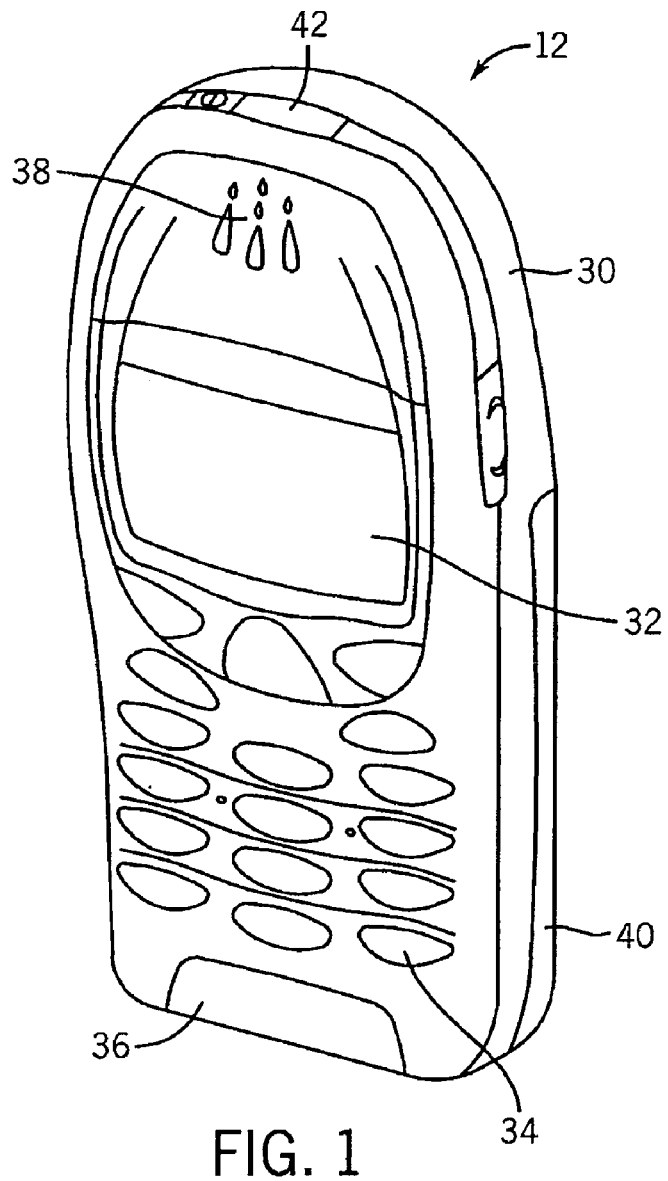
FIG. 1 is a perspective view of a mobile telephone that can be used in the implementation of the present invention.
Figure 2:
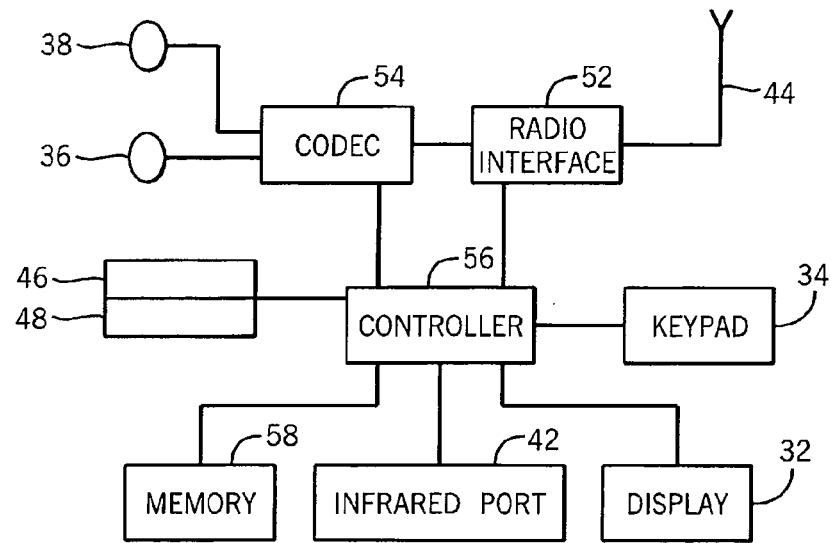
FIG. 2 is a schematic representation of the telephone circuitry of the mobile telephone of FIG. 1.

FIGS. 1 and 2 show one representative mobile telephone 12 within which the present invention may be implemented. It should be understood, however, that the present invention is not intended to be limited to one particular type of mobile telephone 12 or other electronic device. For example, the present invention can be incorporated into a combination personal digital assistant (PDA) and mobile telephone, a PDA, an integrated messaging device (IMD), a desktop computer, and a notebook computer. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a system clock 43, a card reader 48, radio interface circuitry 52, codec circuitry 54, a controller 56 and a memory 58. Individual circuits and elements are all of a type well known in the art, for example in the Nokia range of mobile telephones.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc.

The present invention provides for an open interface that enables the configuration of a VPN gateway that is collocated with an IGD. VPN parameters can be provisioned to VPN clients via UPnP messages. Additionally, another IGD can be configured with a VPN gateway in order to establish a gateway-gateway VPN.

The service of the present invention enables the control, monitoring and configuration of a VPN gateway for unmanaged network space, namely residential and small office LANs. The present invention focuses on the core elements required for setting up a VPN gateway, configuring/provisioning the VPN Clients, and diagnosing and monitoring usage problems. The present invention simplifies the setup experience and provides the framework for diagnosing and monitoring problems on the VPN gateway.

The present invention enables a number of different functions. For example, the present invention allows for the remote setup and configuration of security parameters of an IPsec tunnel accepted by the VPN gateway, through the use of an encryption algorithm and hash functions. The present invention also permits for the remote setup and configuration of an authentication mode accepted by the VPN gateway through the use of shared keys and certificates. The remote configuration and provisioning of VPN Client settings, as well as remote diagnostics and monitoring of a VPN tunnel, are also enabled.

Figure 3:
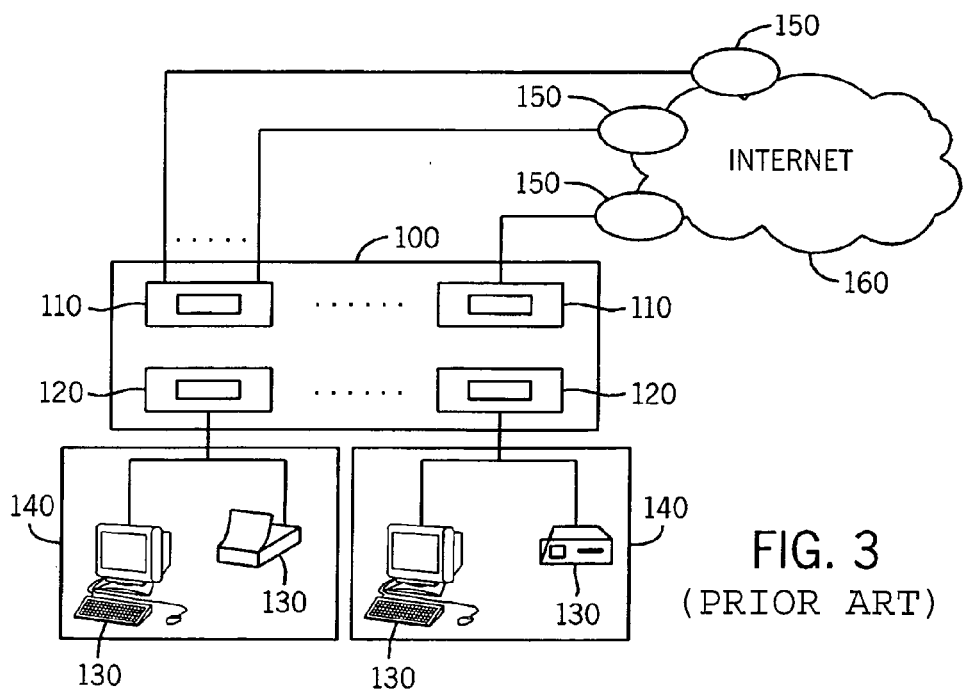
FIG. 3 is a representation of an Internet gateway device and its relationship to other devices in a local area network and a wide area network.

FIG. 3 is a representation of an Internet gateway device 100 and its relationship to other devices in a local area network and a wide area network. The Internet gateway device 100 comprises a plurality of WAN devices 110 and a plurality of LAN devices 120. The plurality of LAN devices 120 are capable of connecting to a plurality of client devices 130, which are located within one or more local area networks 140. The plurality of WAN devices 110 are capable of connecting to various Internet Service Providers (ISPs) 150 that are located within the Internet 160 or another wide area network. This overall arrangement permits the Internet gateway device 100 to serve as a conduit between the client devices 130 and individual ISPs 150.

Figure 4:
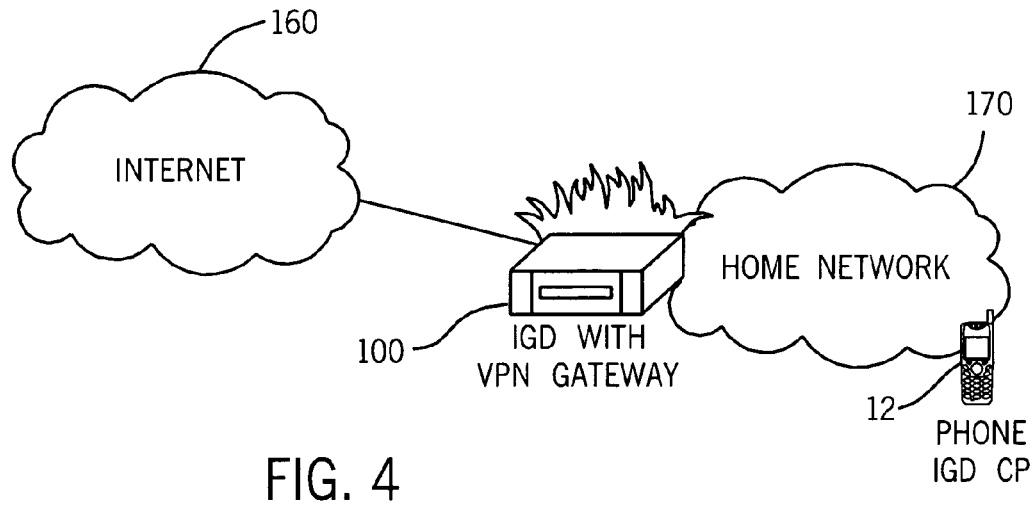
FIG. 4 is a representation of a scenario where a mobile telephone with a built-in IGD control point supporting the present invention is used to configure the Internet gateway device with VPN gateway support.

FIG. 4 describes a scenario where a mobile telephone 12 with a built-in IGD control point supporting a VPN configuration service of the present invention is used to configure the IGD device 100 having VPN gateway support. The mobile telephone 12 is connected within a home network 170 via a LAN interface of the IGD device 100. An application in the mobile telephone 12 can edit the VPN configuration in order to adjust the required security protocols, the authentication and privacy parameters of the security protocols, and the session time-outs. After the configuration step is finished, the mobile telephone 12, now a VPN client, can start using the new configuration.

Figure 5:
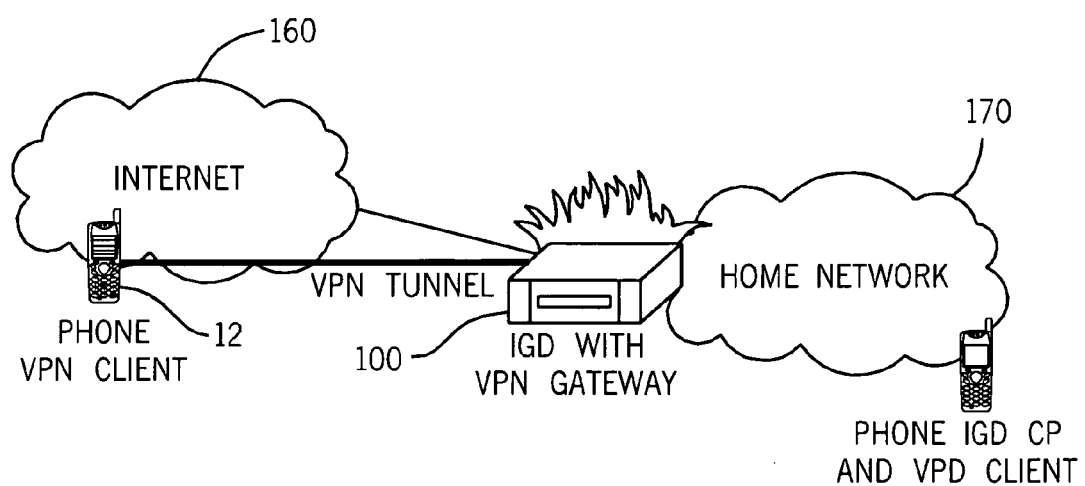
FIG. 5 is a representation of a situation where a VPN tunnel is created between an Internet gateway device and an electronic device that it outside of its home network.

The following is one representative system for provisioning VPN parameters to a VPN Client according to one embodiment of the present invention. In this situation, the mobile telephone 12 possesses a VPN client application. The built-in IGD control point is used to connect the IGD with the VPN gateway via the LAN interface. The built-in IGD control point reads the VPN gateway parameters and configures itself when it acts as the mobile telephone. Parameters needed to configure the gateway include, but are not limited to, the IP Address(es) of the VPN gateway, security protocols, and authentication and privacy parameters specific to the security protocols. Later, and as depicted in FIG. 5, when the mobile telephone 12 is in a remote location and away from the home network 170, the VPN client application can create a VPN tunnel 190 with the home VPN gateway, as the VPN client application possesses all of the necessary parameters.

Figure 6:
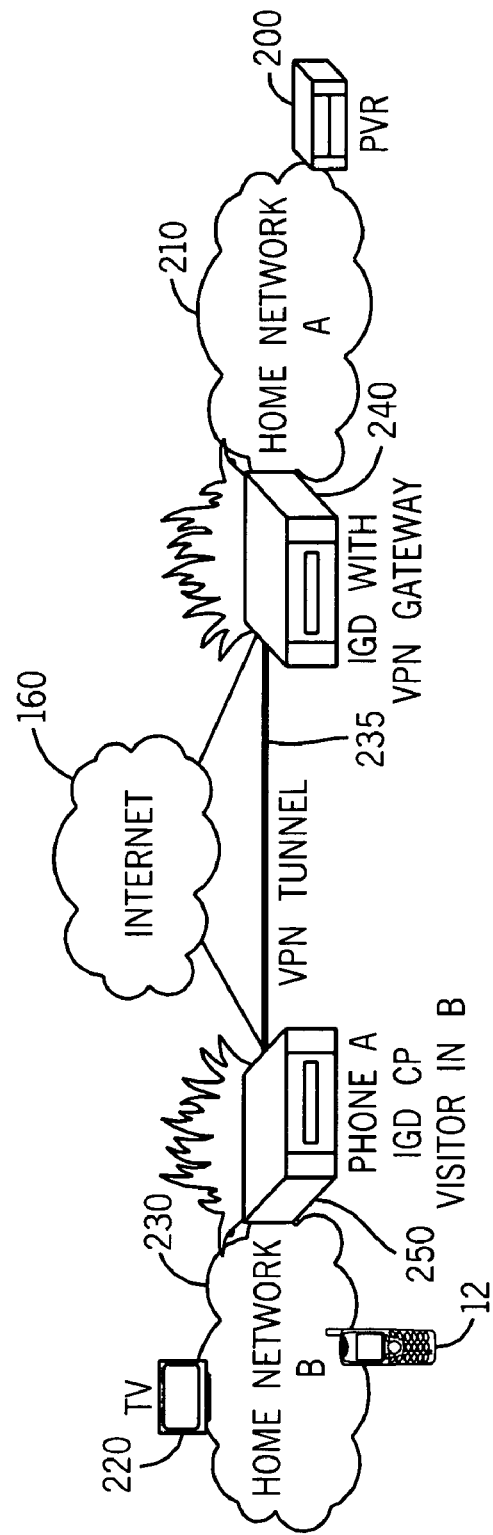
FIG. 6 is a representation of a situation where a VPN gateway-gateway tunnel is created between home networks.

The present invention can also be used to configure another VPN gateway in order to create a gateway-gateway VPN. For example, a situation may arise where a user A is visiting a user B and desires to access a number of media files that are stored in a personal video recorder 200 (PVR) located in user A's home network 210 and view the files on a television 220 in user B's home network 230. To accomplish this task, and as shown in FIG. 6, an IGD-IGD VPN tunnel 235 is created between a Home Network A IGD 240 and a Home Network B IGD 250 so that the two home networks 210 and 230 are essentially merged into a single virtual home network. In this arrangement, it is assumed that the IGD control point in user A's mobile telephone 12 has all the information needed about its home VPN gateway (which is the Home Network A 240). The next step involves the connection of the mobile telephone 12 to the Home Network B IGD 250 with VPN gateway support via a LAN interface. The mobile telephone 12 transmits the necessary information to the VPN gateway for establishing the VPN tunnel. This information includes, but is not limited to, the IP Address(es) of the VPN gateway, security protocols, and authentication and privacy parameters specific to the security protocols.

The following is a process for implementing one particular embodiment of the present invention. Before proceeding, a number of assumptions are made concerning the devices and networks involved. First, it is assumed that the user's home network includes an always-on connection at the user's home. This connection can comprise a broadband connection or a connection of some other sort. It is also assumed that the devices involved are UPnP capable, and that the VPN products involved (i.e. the VPN gateway and the VPN Client) are tested according to standards promulgated by the Virtual Private Network Consortium (VPNC). These standards can be found on the Internet. Furthermore, it is assumed that the IGD with a VPN gateway includes a UPnP IGD VPN configuration service.

In this situation, a user purchases a new Internet gateway device. The feature list for the Internet gateway device indicates support for remote access. The user plugs the Internet gateway device into the home network, and installs the setup software. A setup wizard is used to configure the Internet gateway device. The setup software is used to configure the security protocols, as well as the authentication and privacy parameters for the security protocols. The setup software also binds the VPN gateway to specific WAN interfaces. The setup software includes a built-in UPnP IGD control point. At this point, the IGD with a VPN gateway is ready for use. Regarding advanced functionality, the VPN provides IP addresses from the home network pool to remote devices.

For remote access on a particular device, such as a mobile telephone, the user installs a new software package in the mobile telephone that enables remote access. Later, the user, when leaving his or her office, decides that he or she would like to have an activity initiated on a device within the home network. The user can then have the mobile telephone connect to the home network via remote access to initiate the activity.

A situation where a gateway-gateway VPN may be created can be discussed as follows. A first user and a second user can each have their own home network, referred to as a first home network and a second home network, respectively. In the event that the first user is in the vicinity of the second home network and wants the second user to have access to the first home network, the first user can use his or her own mobile telephone to configure the second user's Internet gateway for remote access to the first network. The first user can therefore grant temporary access to the Internet gateway of the second home network and initiates the connection, creating a gateway-gateway VPN.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
    configuring an apparatus that includes an Internet gateway device control point, using a virtual private network configuration service of the Internet gateway device control point, to permit communication between the apparatus and other apparatuses within a first local area network through a first Internet gateway device collocated with a first virtual private network gateway;
    connecting the apparatus to a second Internet gateway device of a second local area network, the second Internet gateway device being collocated with a second virtual private network gateway, and the second local area network including a second local area network apparatus that is different than the apparatus; and
    transmitting virtual private network configuration parameters from the apparatus to the second Internet gateway device, the transmitting being performed to configure the second Internet gateway device so as to create a virtual private network tunnel that provides the second local area network apparatus with access to one or more of the other apparatuses within the first local area network, the virtual private network tunnel being between the first virtual private network gateway and the second virtual private network gateway.

2. The method of claim 1, wherein configuring the apparatus includes adjusting required security protocols within the apparatus.

3. The method of claim 1, wherein configuring the apparatus includes adjusting authentication and privacy parameters for security protocols within the apparatus.

4. The method of claim 1, wherein configuring the apparatus using the virtual private network configuration service includes adjusting session timeouts for the apparatus using the virtual private network configuration service.

5. The method of claim 1, wherein configuring the apparatus includes obtaining at least one IP address of the first Internet gateway device.

6. The method of claim 1, wherein the apparatus comprises a portable telecommunications device.

7. A non-transitory computer-readable medium storing computer-executable instructions configured to, when executed, cause an apparatus to at least:
    configure an apparatus that includes an Internet gateway device control point using a virtual private network configuration service of the Internet gateway device control point, to permit communication between the apparatus and other apparatuses within a first local area network through a first Internet gateway device in the first local area network while the apparatus is outside of the first local area network;
    establish a connection between the apparatus and a second Internet gateway device of a second local area network, the second local area network including a second local area network apparatus that is different than the apparatus; and
    transmit virtual private network configuration parameters from the apparatus to the second Internet gateway device, the transmitting being performed to configure the second Internet gateway device so as to create a virtual private network tunnel that provides the second local area network apparatus with access to one or more of the other apparatuses within the first local area network, the virtual private network tunnel being between a first virtual private network gateway collocated with the first Internet gateway device and a second virtual private network gateway collocated with the second Internet gateway device.

8. The non-transitory computer-readable medium of claim 7, wherein the configuring the apparatus includes obtaining at least one IP address of the first Internet gateway device.

9. An apparatus comprising:
    a processor; and
    a memory storing computer executable instructions configured to, with the processor, cause the apparatus to at least:
        configure the apparatus for communication with a first Internet gateway device of a first local area network using a virtual private network configuration service of the apparatus;
        establish a connection with a second Internet gateway device of a second local area network, the second local area network including a second local area network apparatus that is different than the apparatus; and transmit virtual private network configuration parameters from the apparatus to the second Internet gateway device, the transmitting being performed to configure the second Internet gateway device so as to create a virtual private network tunnel that provides the second local area network apparatus with access to one or more other apparatuses within the first local area network, the virtual private network tunnel being between a first virtual private network gateway collocated with the first Internet gateway device and a second virtual private network gateway collocated with the second Internet gateway device.

10. A system comprising:
a first local area network including a first Internet gateway device collocated with a first virtual private network gateway and the first local area network including one or more first local area network apparatuses; and
an apparatus, comprising
a processor; and
a memory storing computer executable instructions configured to, with the processor, cause the apparatus to at least:
configure the apparatus to be capable of communication with the first Internet gateway device using a virtual private network configuration service of the apparatus;
establish a connection between the apparatus and a second Internet gateway device of a second local area network, the second local area network including a second local area network apparatus that is different than the apparatus; and
transmit virtual private network configuration parameters from the apparatus to the second Internet gateway device, the transmitting being performed to configure the second Internet gateway device so as to create a virtual private network tunnel that provides the second local area network apparatus with access to the one or more first local area network apparatuses within the first local area network, the virtual private network tunnel having a first end at the first virtual private network gateway and a second end at a second virtual private network gateway collocated with the second Internet gateway device.

11. A system comprising:
a first Internet gateway device positioned within a first network; and
a second Internet gateway device positioned within a second network, the second network including a second local area network apparatus,
wherein each of the first Internet gateway device and the second Internet gateway device is configured to provide virtual private network service via a virtual private network tunnel having a first end at a first virtual private network gateway collocated with the first Internet gateway device and a second end at a second virtual private network gateway collocated with the second Internet gateway device;
wherein the second Internet gateway device is further configured to modify its own settings based on information received from an apparatus associated with the first network so as to create the virtual private network tunnel that provides the second local area network apparatus with access to one or more apparatuses within the first network using the virtual private network tunnel, the apparatus associated with the first network being different than the second local area network apparatus and the apparatus associated with the first network being within the second network when the second Internet gateway device receives the information from the apparatus associated with the first network.

12. The method of claim 1, wherein the virtual private network tunnel is temporary.

13. The apparatus of claim 9, wherein the memory further stores computer executable instructions configured to, with the processor, cause the apparatus to obtain at least one IP address of the first Internet gateway device.

14. The system of claim 10, wherein a memory of the apparatus further stores computer executable instructions configured to, with the processor of the apparatus, cause the apparatus to obtain at least one IP address of the first Internet gateway device.

15. The system of claim 11, wherein the information includes at least one IP address of the first Internet gateway device.

16. A method comprising:
providing a virtual private network service via a virtual private network tunnel that provides a local area network apparatus within a local area network with access to one or more other apparatuses within a home local area network, the virtual private network tunnel being between a first virtual private network gateway collocated with a first Internet gateway device in the home local area network and a second virtual private network gateway collocated with a second Internet gateway device in the local area network,
wherein the home local area network is associated with an apparatus and the home local area network is remote from the local area network,
wherein providing the virtual private network service includes creating the virtual private network tunnel in response to virtual private network configuration parameters being transmitted from the apparatus to the second Internet gateway device, and
wherein the local area network includes the local area network apparatus, the local area network apparatus is different than the apparatus, and the apparatus is located within the local area network when the virtual private network tunnel is created.

17. The method of claim 16, wherein the virtual private network tunnel is temporary.

18. An apparatus comprising:
a processor;
a memory storing computer-executable instructions configured to, with the processor, cause the apparatus to at least:
provide a virtual private network service via a virtual private network tunnel that provides a local area network apparatus within a local area network with access to one or more other apparatuses within a home local area network, the virtual private network tunnel being between a first virtual private network gateway collocated with a first Internet gateway device in the home local area network and a second virtual private network gateway collocated with a second Internet gateway device in the local area network,
wherein the home local area network is associated with the apparatus and the home local area network is remote from the local area network,
wherein creation of the virtual private network tunnel is initiated based upon virtual private network configuration parameters transmitted from the apparatus to the second Internet gateway device, and wherein the local area network includes the local area network apparatus, the local area network apparatus is different than the apparatus, and the apparatus is located within the local area network when the virtual private network tunnel is created.

19. The apparatus of claim 18, wherein the virtual private network tunnel is temporary.

20. The method of claim 1, wherein the apparatus is a mobile telephone and the virtual private network configuration parameters include an internet protocol address of the first Internet gateway device, one or more security protocol parameters for establishing the virtual private network tunnel, one or more authentication parameters specific to a security protocol, and one or more privacy parameters specific to the security protocol.

* * * * *